US012591196B2

(12) United States Patent
Sawayanagi

(10) Patent No.: US 12,591,196 B2
(45) Date of Patent: Mar. 31, 2026

(54) IMAGE FORMING APPARATUS WITH USER OPERATED COVER FOR REMOVABLE UNIT

(71) Applicant: FUJIFILM BUSINESS INNOVATION CORP., Tokyo (JP)

(72) Inventor: Tsubasa Sawayanagi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 435 days.

(21) Appl. No.: 18/156,756

(22) Filed: Jan. 19, 2023

(65) Prior Publication Data

US 2024/0036508 A1 Feb. 1, 2024

(30) Foreign Application Priority Data

Jul. 27, 2022 (JP) ................................ 2022-119592

(51) Int. Cl.
*G03G 21/00* (2006.01)
*G03G 21/12* (2006.01)
*G03G 21/16* (2006.01)

(52) U.S. Cl.
CPC ......... *G03G 21/1633* (2013.01); *G03G 21/12* (2013.01); *G03G 21/1647* (2013.01); *G03G 21/169* (2013.01); *G03G 2221/1624* (2013.01); *G03G 2221/169* (2013.01)

(58) Field of Classification Search
CPC ............... G03G 15/0865; G03G 21/12; G03G 21/1633; G03G 21/1647; G03G 21/1842; G03G 21/1691; G03G 21/1676; G03G 21/168; G03G 21/1685; G03G 21/169; G03G 2215/066; G03G 2221/1687; G03G 2221/169; G03G 21/1884; G03G 2221/1624; G03G 2221/163; G03G 2221/1639; G03G 2221/1642
USPC .................................................. 399/110, 111
See application file for complete search history.

(56) References Cited

U.S. PATENT DOCUMENTS

2005/0191090 A1* 9/2005 Nishimura ......... G03G 21/1821 399/119
2010/0021204 A1* 1/2010 Nakazawa ............. G03G 21/10 399/120
2012/0163858 A1* 6/2012 Fujii ................... G03G 21/105 399/116
2015/0139688 A1* 5/2015 Leemhuis .......... G03G 21/1652 399/110

(Continued)

FOREIGN PATENT DOCUMENTS

JP 2010-032656 A 2/2010
JP 2019-113760 A 7/2019

*Primary Examiner* — Robert B Beatty
(74) *Attorney, Agent, or Firm* — Oliff PLC

(57) ABSTRACT

An image forming apparatus includes: an apparatus body; a removable body that is removably attachable to the apparatus body; an installation body including an operating part that operates when manipulated by a user, the installation body being installed in the apparatus body such that the installation body covers at least a portion of the removable body; and an urging unit that operates in association with the operating part and urges the removable body in an attachment direction, in which the removable body is attached to the apparatus body, while at least the portion of the removable body is covered by the installation body.

15 Claims, 12 Drawing Sheets

(56) References Cited

U.S. PATENT DOCUMENTS

| | | | | |
|---|---|---|---|---|
| 2016/0170371 A1* | 6/2016 | Kubo | G03G 21/1842 | |
| | | | 399/110 | |
| 2018/0120765 A1* | 5/2018 | Seto | G03G 21/1842 | |
| 2021/0302909 A1* | 9/2021 | Hashimoto | G03G 21/1842 | |

* cited by examiner

IMAGE FORMING APPARATUS WITH USER OPERATED COVER FOR REMOVABLE UNIT

CROSS-REFERENCE TO RELATED APPLICATIONS

This application is based on and claims priority under 35 USC 119 from Japanese Patent Application No. 2022-119592 filed Jul. 27, 2022.

BACKGROUND

(i) Technical Field

The present disclosure relates to an image forming apparatus.

(ii) Related Art

Japanese Unexamined Patent Application Publication No. 2019-113760 describes a structure in which a waste-toner transport unit is removably attachable to an apparatus body together with a waste-toner recovery container, and in which the waste-toner recovery container and the waste-toner transport unit are inseparable from each other when removed from the apparatus body.

Japanese Unexamined Patent Application Publication No. 2010-32656 describes a toner recovery unit that is removably attached to an image forming apparatus and that includes a waste-toner storage tank, a frame, an opening-closing member, and a moving member.

SUMMARY

An image forming apparatus that forms an image may be provided with a removable body that is removably attachable to the image forming apparatus.

To attach the removable body to the image forming apparatus, a user may, for example, be required to manually push the removable body in an attachment direction in which the removable body is attached. However, in this case, the position of the removable body is determined by the extent to which the user pushes the removable body, and there is a possibility that the user will activate the image forming apparatus without pushing the removable body by the required amount.

Aspects of non-limiting embodiments of the present disclosure relate to an image forming apparatus in which a removable body is more reliably fixed at an appropriate position compared to when a user manually pushes the removable body to attach the removable body to the image forming apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image forming apparatus including: an apparatus body; a removable body that is removably attachable to the apparatus body; an installation body including an operating part that operates when manipulated by a user, the installation body being installed in the apparatus body such that the installation body covers at least a portion of the removable body; and an urging unit that operates in association with the operating part and urges the removable body in an attachment direction, in which the removable body is attached to the apparatus body, while at least the portion of the removable body is covered by the installation body.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described with reference to the accompanying drawings.

Figure 1:
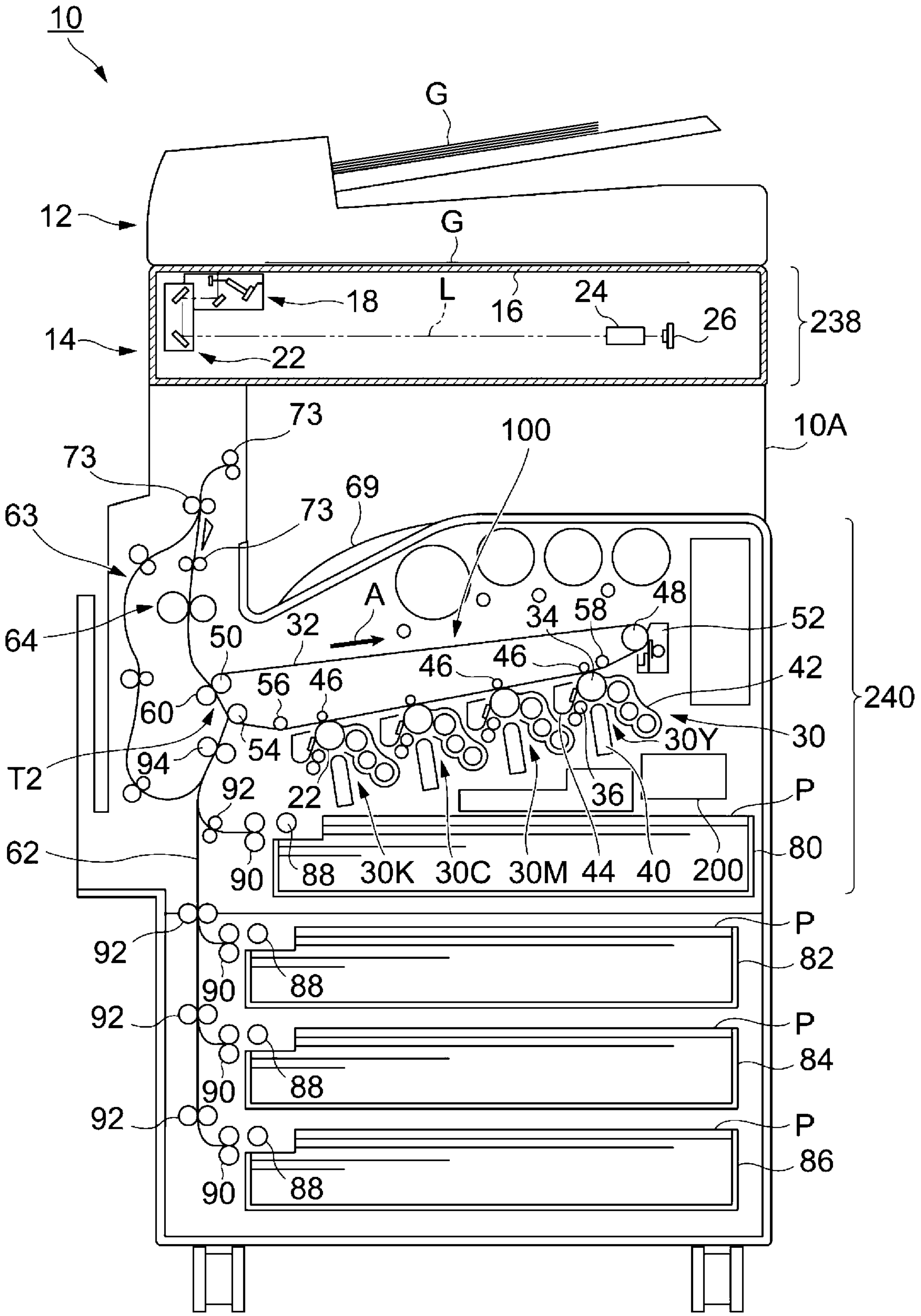
FIG. 1 schematically illustrates the internal structure of an image forming apparatus.

FIG. 1 schematically illustrates the internal structure of an image forming apparatus 10 according to the present exemplary embodiment.

The image forming apparatus 10 includes an image forming section 240, which is an example of an image former for forming an image on a paper sheet P, which is an example of a recording material.

The image forming apparatus 10 includes a controller 200 that controls components of the image forming apparatus 10.

A document transport device 12, which transports plural sheets of a document G one at a time, is provided in an upper section of an apparatus body 10A of the image forming apparatus 10. The apparatus body 10A is a portion that serves as a housing and that has a function of supporting other members. The apparatus body 10A constitutes a portion of the image forming apparatus 10.

An image reading unit 238, which reads the document G, is also provided in the upper section of the apparatus body 10A. The image reading unit 238 reads the document G that is transported by the document transport device 12 or placed on a platen glass 16.

The image reading unit 238 includes a first mirror unit 18 that includes a light source and moves along the platen glass 16. The image reading unit 238 also includes a second mirror unit 22 that reflects light that is reflected by the document and then reflected by the first mirror unit 18.

The light reflected by the second mirror unit 22 passes through a lens 24 and travels toward a light receiving element 26, such as a charge-coupled-device (CCD) line sensor.

The image forming section 240 includes plural image forming units 30 that form toner images of different colors.

Four image forming units 30Y, 30M, 30C, and 30K for yellow (Y), magenta (M), cyan (C), and black (K), respectively, are provided as the image forming units 30.

A transfer unit 100 is provided above the image forming units 30.

The transfer unit 100 includes an intermediate transfer belt 32 to which the toner images formed by the image forming units 30 are transferred. The intermediate transfer belt 32 rotates in the direction of arrow A.

The transfer unit 100 also includes rollers provided inside the intermediate transfer belt 32, the rollers including a driving roller 48 that drives the intermediate transfer belt 32, a support roller 50 that supports the intermediate transfer belt 32 from the inside, a tension-applying roller 54 that applies tension to the intermediate transfer belt 32, and idler rollers 56 and 58 that are in contact with the intermediate transfer belt 32.

The transfer unit 100 also includes a belt cleaning device 52 that cleans the intermediate transfer belt 32.

Each image forming unit 30 includes a photoconductor drum 34, which is an example of an image carrier that holds a toner image formed thereon, and a charging member 36 that charges the photoconductor drum 34.

Each image forming unit 30 also includes an exposure device 40 that exposes the photoconductor drum 34 to light and a developing unit 42 that forms a toner image by causing toner to adhere to an electrostatic latent image formed on the photoconductor drum 34 by the exposure device 40.

A first transfer member 46, which is used to transfer the toner image formed on the photoconductor drum 34 to the intermediate transfer belt 32, is provided to face the photoconductor drum 34 with the intermediate transfer belt 32 disposed therebetween.

Each image forming unit 30 also includes a removing device 44 that removes the toner and other substances that have not been transferred from the photoconductor drum 34 to the intermediate transfer belt 32 and that remain on the photoconductor drum 34. The removing device 44 removes the toner and other substances, which are substances adhering to the surface of the photoconductor drum 34, from the surface.

A second transfer member 60, which is used to transfer the toner images on the intermediate transfer belt 32 to the paper sheet P, is provided to face the support roller 50 with the intermediate transfer belt 32 disposed therebetween.

In this specification, the location at which the second transfer member 60 is provided is referred to as a second transfer section T2.

Paper-sheet storage units 80, 82, 84, and 86, in which paper sheets P are stored, are disposed in a lower section of the apparatus body 10A at locations upstream of the second transfer section T2 in a transport direction in which the paper sheets P are transported.

Each of the paper-sheet storage units 80, 82, 84, and 86 includes a feed roller 88 that feeds the paper sheets P that are stored. In addition, a transport roller 90 and a transport roller 92 that transport the paper sheets P are provided downstream of the feed roller 88.

A feed roller 94 that temporarily stops each paper sheet P and then feeds the paper sheet P to the second transfer section T2 at a predetermined time is provided downstream of the transport rollers 92.

In the present exemplary embodiment, the feed roller 94 supplies each paper sheet P to the second transfer section T2.

A fixing device 64 is provided downstream of the second transfer section T2 in the transport direction of the paper sheet P.

In the present exemplary embodiment, the toner images on the intermediate transfer belt 32 are transferred to the paper sheet P at the second transfer section T2. In the present exemplary embodiment, the paper sheet P to which the toner images have been transferred passes through the fixing device 64. The fixing device 64 applies heat and pressure to the paper sheet P to which the toner images have been transferred, and thereby fixes the toner images to the paper sheet P.

A paper-sheet receiving portion 69 on which the paper sheet P having the toner images fixed thereto is placed is provided downstream of the fixing device 64 in the transport direction of the paper sheet P.

Plural transport rollers 73 that transport the paper sheet P are provided downstream of the fixing device 64. In the present exemplary embodiment, the transport rollers 73 transport the paper sheet P having the toner images fixed thereto to the paper-sheet receiving portion 69.

In addition, in the present exemplary embodiment, a reversing mechanism 63 that reverses the paper sheet P is provided.

In the present exemplary embodiment, when images are to be formed on both sides of the paper sheet P, the paper sheet P is reversed by the reversing mechanism 63, and then supplied to the second transfer section T2 again. Thus, the toner images are formed on both front and back sides of the paper sheet P.

To form an image on the paper sheet P, first, the exposure devices 40 included in the image forming units 30Y, 30M, 30C, and 30K emit light based on image data of respective colors.

The thus-emitted light is directed onto the surfaces of the photoconductor drums 34 of the respective colors that are charged by the respective charging members 36. Thus, the photoconductor drums 34 are exposed to light, so that electrostatic latent images are formed on the surfaces of the photoconductor drums 34.

The electrostatic latent images formed on the surfaces of the photoconductor drums 34 are developed into toner images of the respective colors by the respective developing units 42.

The yellow (Y), magenta (M), cyan (C), and black (K) toner images formed on the surfaces of the photoconductor drums 34 are transferred to the intermediate transfer belt 32 by the first transfer members 46. Thus, a toner image in which the toner images of the respective colors are superposed is formed on the intermediate transfer belt 32.

In the present exemplary embodiment, the thus-formed toner image is transferred to the paper sheet P supplied to the second transfer section T2 in the second transfer section T2.

In the present exemplary embodiment, the paper sheet P to which the toner image has been transferred reaches the fixing device 64, which fixes the toner image to the paper sheet P. Thus, the paper sheet P having an image formed thereon is obtained. After that, the paper sheet P is transported to the paper-sheet receiving portion 69 and placed on the paper-sheet receiving portion 69.

When images are to be formed on both sides of the paper sheet P, the paper sheet P is placed on the paper-sheet receiving portion 69 after the images are formed on both front and back sides of the paper sheet P.

Figure 2:
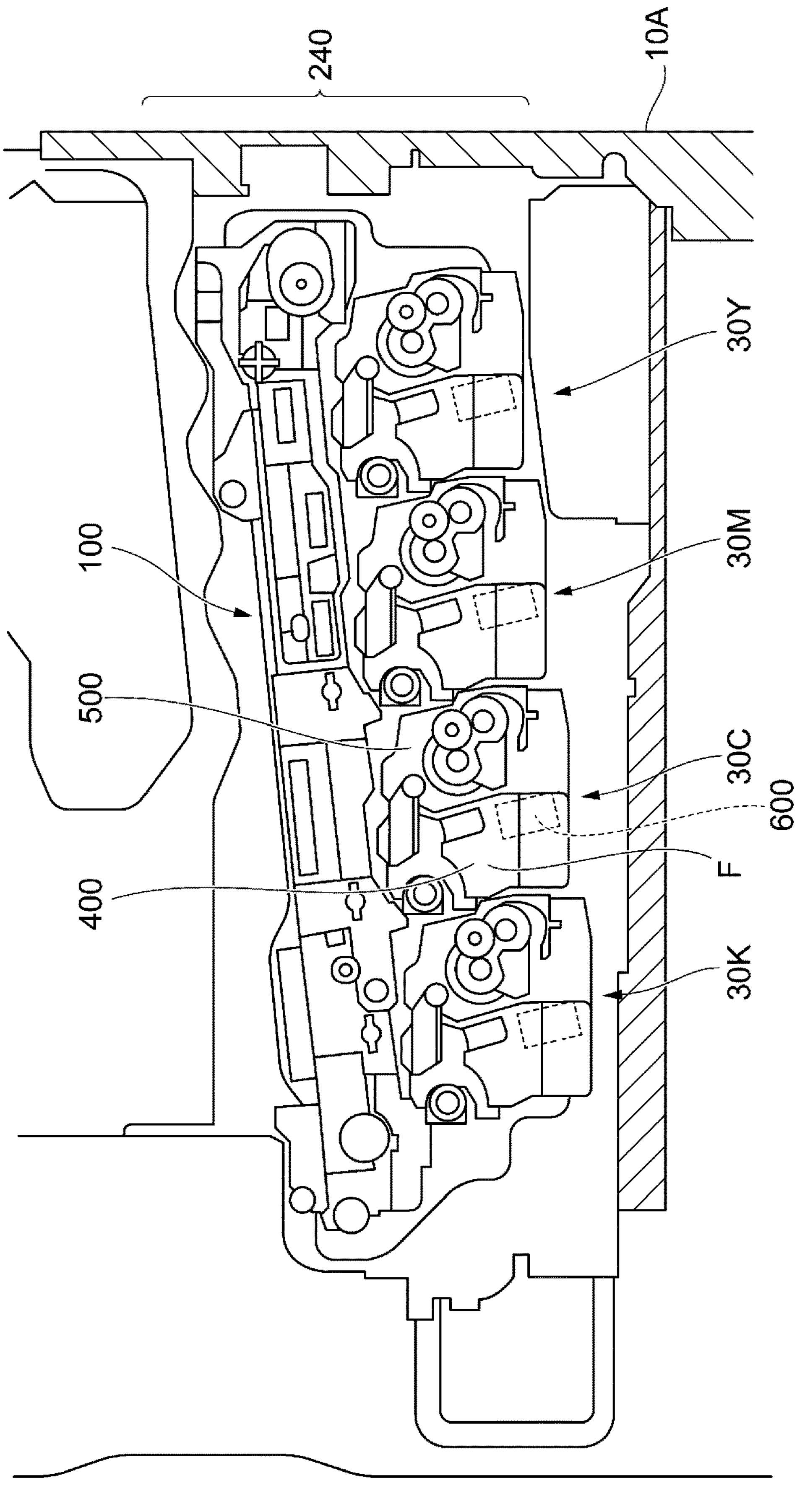
FIG. 2 illustrates in detail the structure of an image forming section.

FIG. 2 illustrates in detail the structure of the image forming section 240.

In the present exemplary embodiment, each of the image forming units 30Y, 30M, 30C, and 30K includes a drum unit 400 and a developing unit 500. In addition, in the present exemplary embodiment, an exposure unit 600 is provided behind a frame F included in the drum unit 400.

In the present exemplary embodiment, the drum unit 400 includes the photoconductor drum 34, the charging member 36, and the removing device 44 illustrated in FIG. 1, the developing unit 500 includes the developing unit 42 illustrated in FIG. 1, and the exposure unit 600 includes the exposure device 40 illustrated in FIG. 1.

In the present exemplary embodiment, each of the drum unit 400, the developing unit 500, and the exposure unit 600 is removably attachable to the apparatus body 10A.

More specifically, in the present exemplary embodiment, each of the drum unit 400, the developing unit 500, and the exposure unit 600 is capable of being removed from the apparatus body 10A by being pulled outward in a direction orthogonal to the plane of FIG. 2.

Each of these units is also capable of being attached to the apparatus body 10A by being inward in the direction orthogonal to the plane of FIG. 2.

Figure 3:
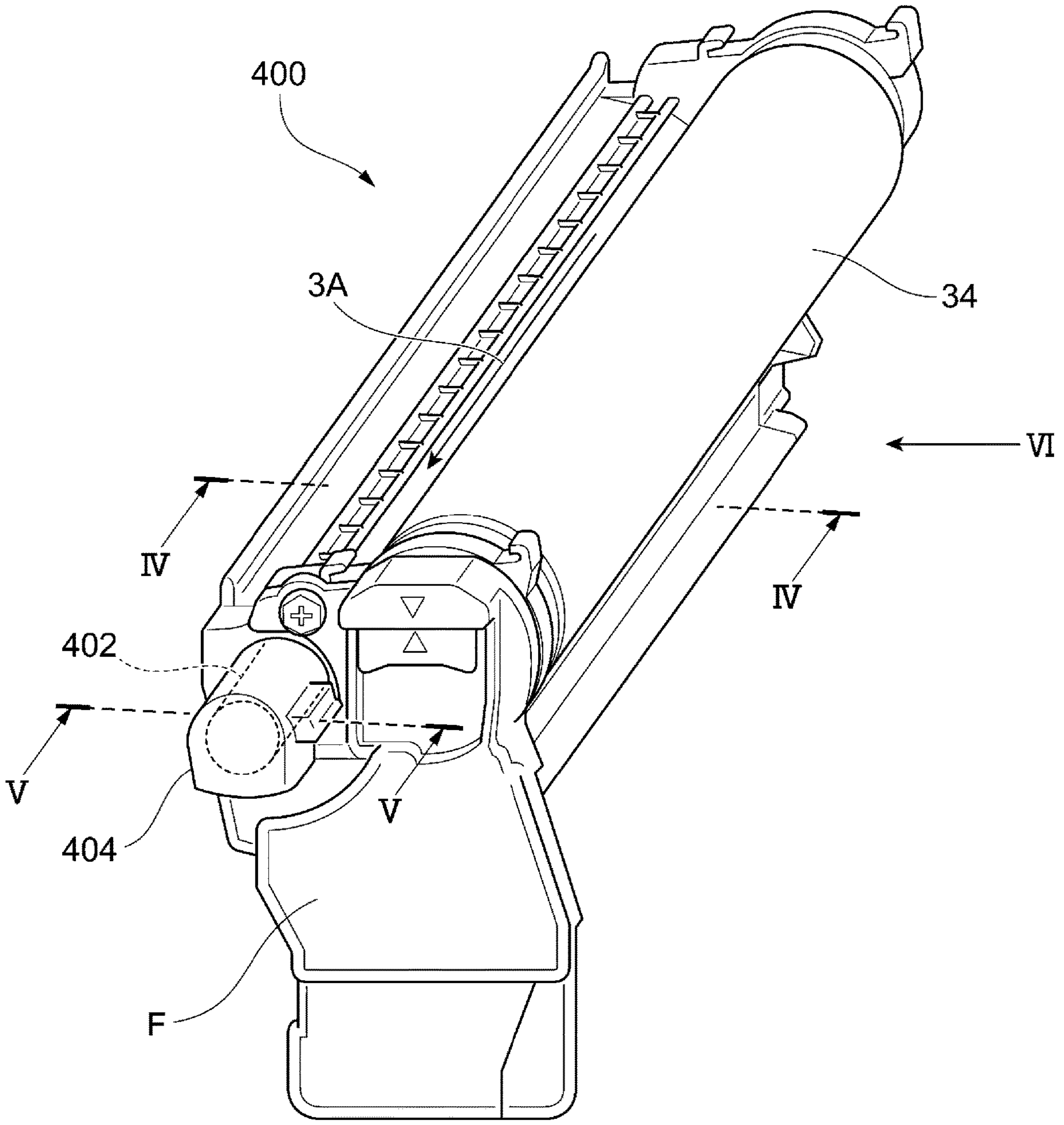
FIG. 3 is a perspective view of a drum unit.
Figure 4:
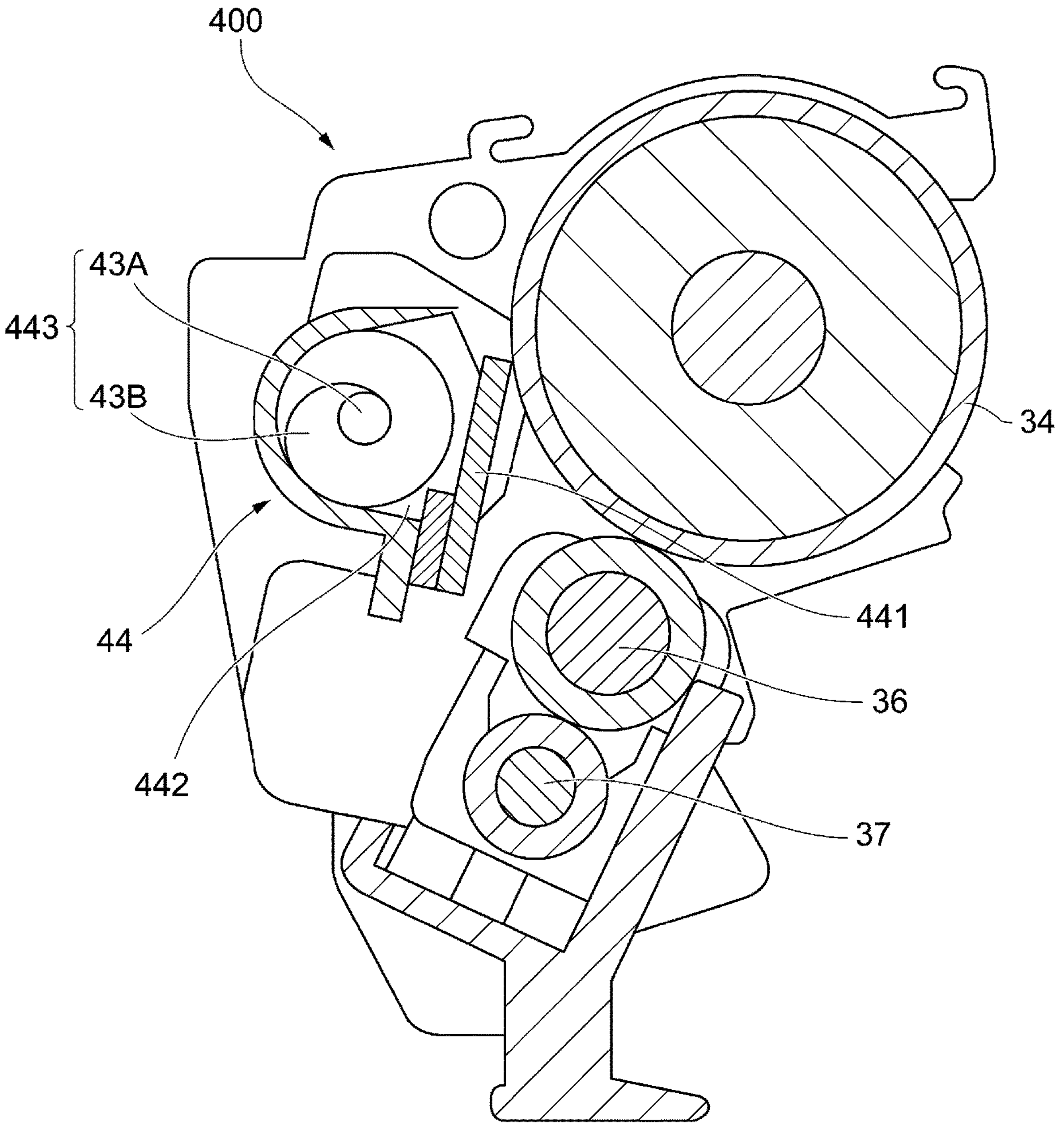
FIG. 4 is a sectional view of the drum unit taken along line IV-IV in FIG. 3.

FIG. 3 is a perspective view of the drum unit 400. FIG. 4 is a sectional view of the drum unit 400 taken along line Iv-Iv in FIG. 3.

As illustrated in FIGS. 3 and 4, the drum unit 400, which is an example of a removable body, includes the photoconductor drum 34, which is an example of an image carrier.

As illustrated in FIG. 4, the drum unit 400 also includes the charging member 36 that charges the photoconductor drum 34 and a cleaning member 37 that cleans the charging member 36.

As illustrated in FIG. 4, the drum unit 400 also includes the removing device 44 that removes the substances adhering to the photoconductor drum 34, such as the toner remaining on the photoconductor drum 34.

In the present exemplary embodiment, the removing device 44 includes a cleaning blade 441 as a portion thereof. The cleaning blade 441 is disposed in contact with the surface of the photoconductor drum 34, and scrapes off the substances adhering to the surface of the photoconductor drum 34 to remove the substances from the surface of the photoconductor drum 34.

The thus-removed substances are discharged from the drum unit 400 and serve as discharged substances.

The removing device 44 includes a receiving unit 442 that receives the substances removed from the photoconductor drum 34 by the cleaning blade 441.

A transport member 443 that transports the removed substances is disposed in the receiving unit 442. The transport member 443 is disposed to extend in an axial direction of the photoconductor drum 34 illustrated in FIG. 3.

As illustrated in FIG. 4, the transport member 443 includes a rotating shaft 43A and a projecting portion 43B that projects from a surface of the rotating shaft 43A. The projecting portion 43B extends helically around the rotating shaft 43A.

In the present exemplary embodiment, the rotating shaft 43A is rotated by a drive source (not illustrated) so that the projecting portion 43B pushes the removed substances in an axial direction of the rotating shaft 43A. Thus, the removed substances are transported in the direction shown by arrow 3A in FIG. 3.

In the present exemplary embodiment, the transport member 443 transports the removed substances to a cylindrical portion 402 illustrated in FIG. 3. In the present exemplary embodiment, a cover member 404 is provided around the cylindrical portion 402.

Figure 5:
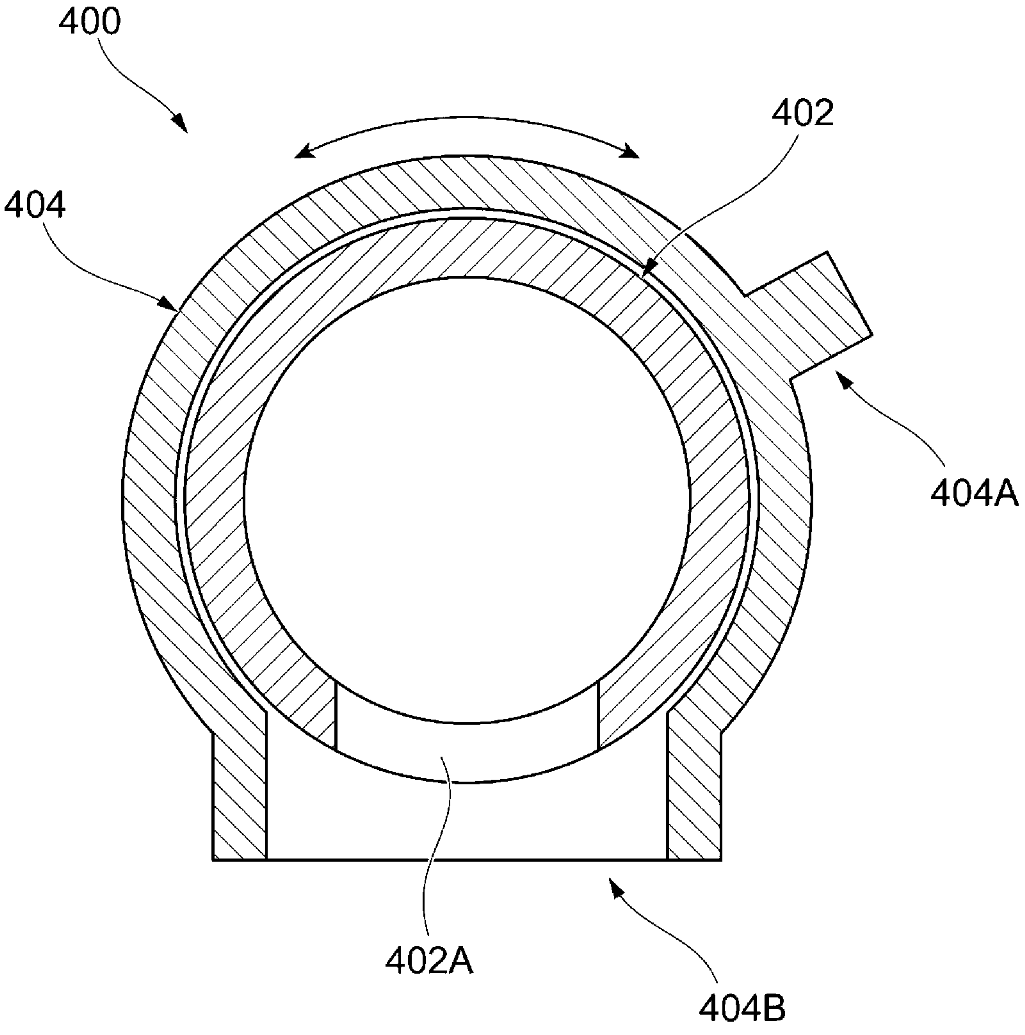
FIG. 5 is a sectional view of the drum unit taken along line V-V in FIG. 3.

FIG. 5 is a sectional view of the drum unit 400 taken along line V-V in FIG. 3.

As illustrated in FIG. 5, the drum unit 400 includes the cylindrical portion 402. In the present exemplary embodiment, the transport member 443 (see FIG. 4) transports the removed substances to the cylindrical portion 402.

The cylindrical portion 402 has an opening 402A at the bottom, and the removed substances are discharged through the opening 402A in the present exemplary embodiment. The removed substances serve as substances to be discharged from the drum unit 400, and the substances to be discharged from the drum unit 400 fall downward through the opening 402A in the cylindrical portion 402 in the present exemplary embodiment.

A portion of an installation body, which will be described below, is disposed below the opening 402A in the cylindrical portion 402, and the substances discharged from the opening 402A are delivered to the installation body.

In addition, in the present exemplary embodiment, the cover member 404 that is movable around the cylindrical portion 402 is provided to cover the opening 402A in the cylindrical portion 402.

The cover member 404 is capable of rotating about the cylindrical portion 402 in a circumferential direction of the cylindrical portion 402.

A projecting portion 404A that projects outward in a radial direction of the cover member 404 is provided on an outer peripheral surface of the cover member 404.

The cover member 404 is positioned such that an opening 404B provided therein faces the opening 402A in the cylindrical portion 402 in a state illustrated in FIG. 5, and the substances discharged from the drum unit 400 are delivered to the outside of the drum unit 400 in the state illustrated in FIG. 5.

In the present exemplary embodiment, when the cover member 404 in the state illustrated in FIG. 5 is rotated clockwise by 90°, the cover member 404 is positioned to face the opening 402A in the cylindrical portion 402, so that the opening 402A in the cylindrical portion 402 is covered.

Figure 6:
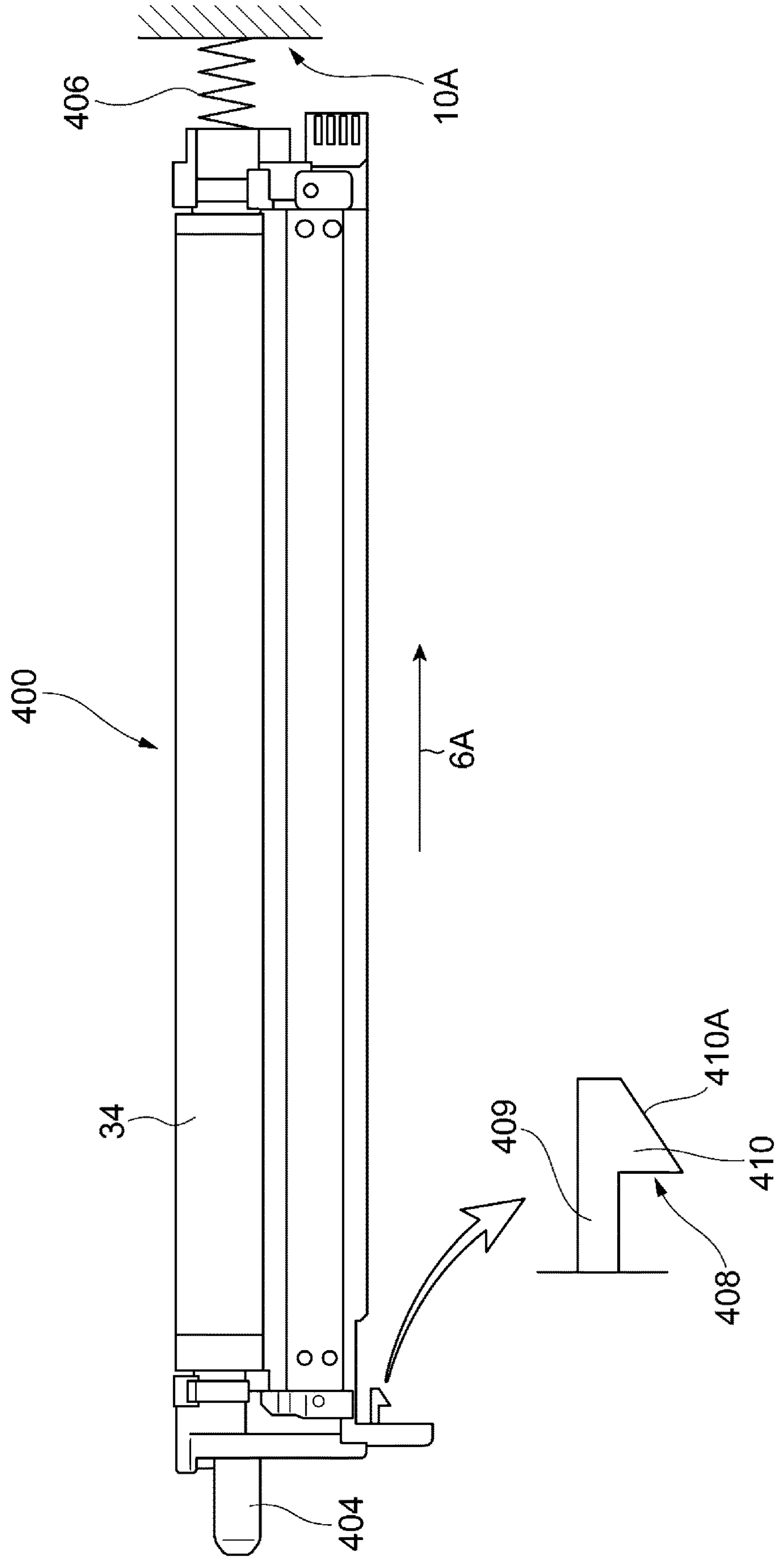
FIG. 6 illustrates the drum unit viewed from the direction shown by arrow VI in FIG. 3.

FIG. 6 illustrates the drum unit 400 viewed in the direction shown by arrow VI in FIG. 3. FIG. 6 also illustrates a spring member 406, which is an example of an urging member and provided on the apparatus body 10A of the image forming apparatus 10.

In the present exemplary embodiment, an overpassing portion 408, which passes over an overpassing target portion (described below) provided on the apparatus body 10A, is provided in a lower section of the drum unit 400.

The drum unit 400 includes an elastic portion 409, which extends in the axial direction of the photoconductor drum 34, and a projection 410, which is provided at a distal end of the elastic portion 409 and projects downward from the elastic portion 409, in the lower section thereof. In the present exemplary embodiment, the overpassing portion 408 is constituted by the projection 410.

In FIG. 6, the direction shown by arrow 6A is an attachment direction in which the drum unit 400 is attached.

In the present exemplary embodiment, the elastic portion 409 extends in the attachment direction. The bottom surface of the projection 410 provided at the distal end of the elastic portion 409 includes an inclined surface 410A that is inclined away from the elastic portion 409 in an opposite direction that is opposite to the attachment direction.

In the present exemplary embodiment, as described above, the spring member 406, which is an example of an urging member, is provided at a position further in the attachment direction of the drum unit 400 than the drum unit 400. The spring member 406 is provided on the apparatus body 10A of the image forming apparatus 10.

The spring member 406 presses the drum unit 400 in the opposite direction that is opposite to the attachment direction of the drum unit 400, and thereby urges the drum unit 400 in the opposite direction.

Figures 7A, 7B:
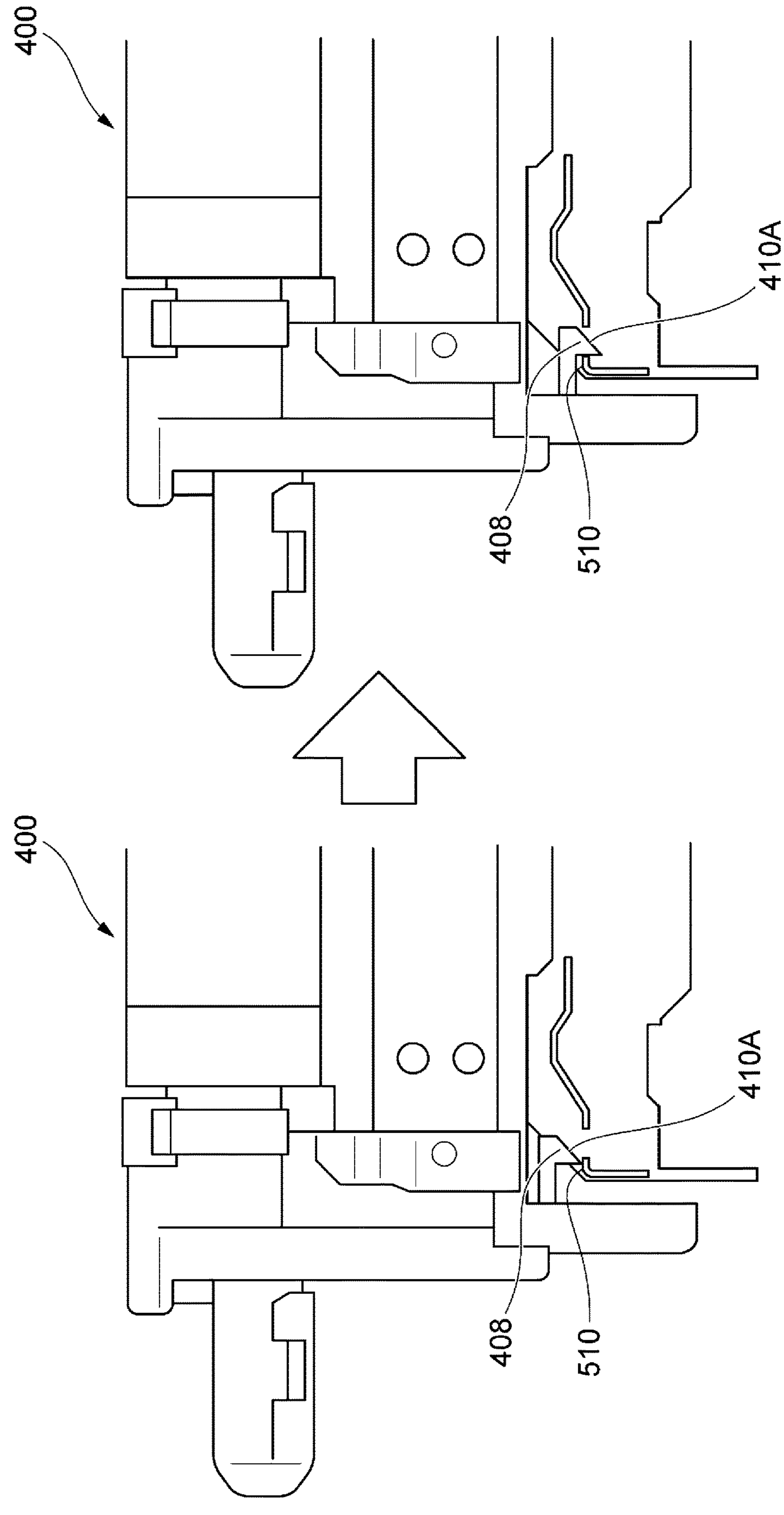
FIGS. 7A and 7B illustrate the structure of an apparatus body.

FIGS. 7A and 7B illustrate the structure of the apparatus body 10A.

In the present exemplary embodiment, as illustrated in FIG. 7A, an overpassing target portion 510 over which the overpassing portion 408 passes is provided on the apparatus body 10A.

In the present exemplary embodiment, when the user presses the drum unit 400 in the attachment direction, as illustrated in FIGS. 7A and 7B, the overpassing portion 408 provided on the drum unit 400 passes over the overpassing target portion 510 provided on the apparatus body 10A.

More specifically, when the drum unit 400 is pressed in the attachment direction, the inclined surface 410A of the overpassing portion 408 comes into contact with the overpassing target portion 510, and the overpassing portion 408 moves upward, as illustrated in FIG. 7A. Thus, the overpassing portion 408 moves along the overpassing target portion 510.

When the drum unit 400 is further pressed in the attachment direction, the overpassing portion 408 moves completely past the overpassing target portion 510. Then, in the present exemplary embodiment, the overpassing portion 408 moves downward due to the restoring force of the elastic portion 409.

Thus, as illustrated in FIG. 7B, the overpassing portion 408 provided on the drum unit 400 passes over the overpassing target portion 510.

When the overpassing portion 408 passes over the overpassing target portion 510, the drum unit 400 is disposed at a predetermined position in the apparatus body 10A.

In the present exemplary embodiment, as described above, the spring member 406 urges the drum unit 400 in the opposite direction. Therefore, in the present exemplary embodiment, after the overpassing portion 408 (see FIG. 7B) passes over the overpassing target portion 510, the overpassing portion 408 is urged toward the overpassing target portion 510 and comes into contact with the overpassing target portion 510, as illustrated in FIG. 7B.

In the present exemplary embodiment, the overpassing portion 408 comes into contact with the overpassing target portion 510 so that the drum unit 400 is positioned in the attachment direction of the drum unit 400.

Figure 8B:
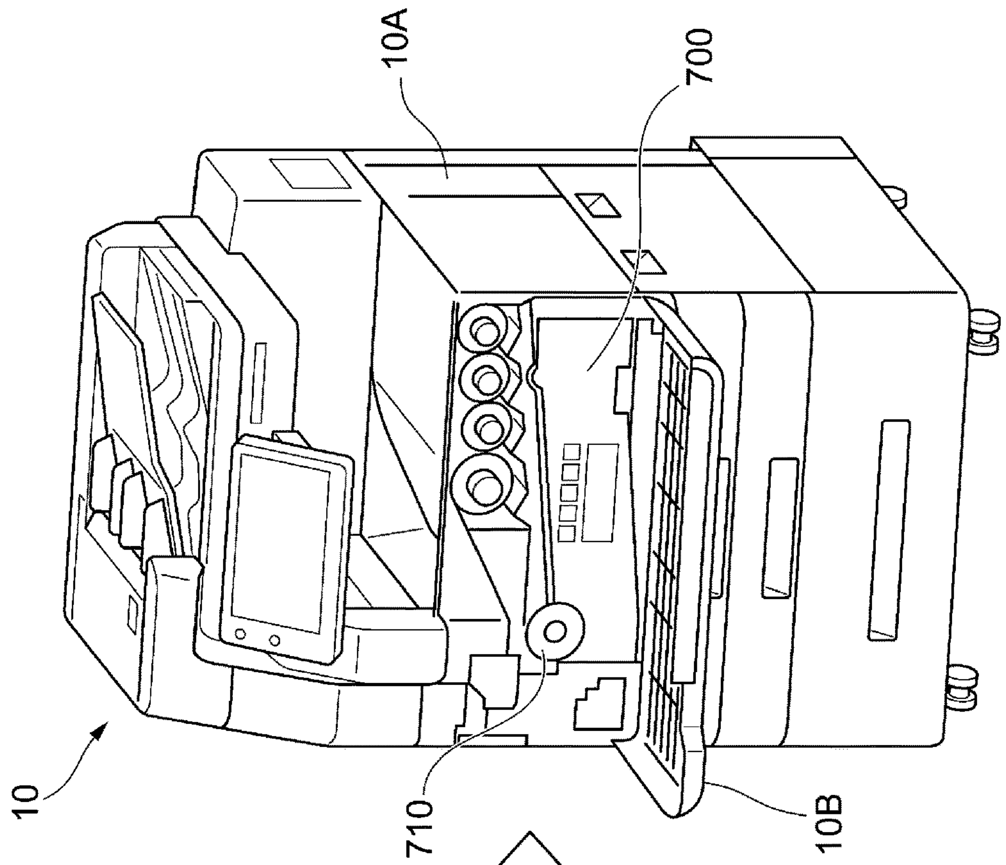
FIGS. 8A and 8B are perspective views of the image forming apparatus.
Figure 8A:
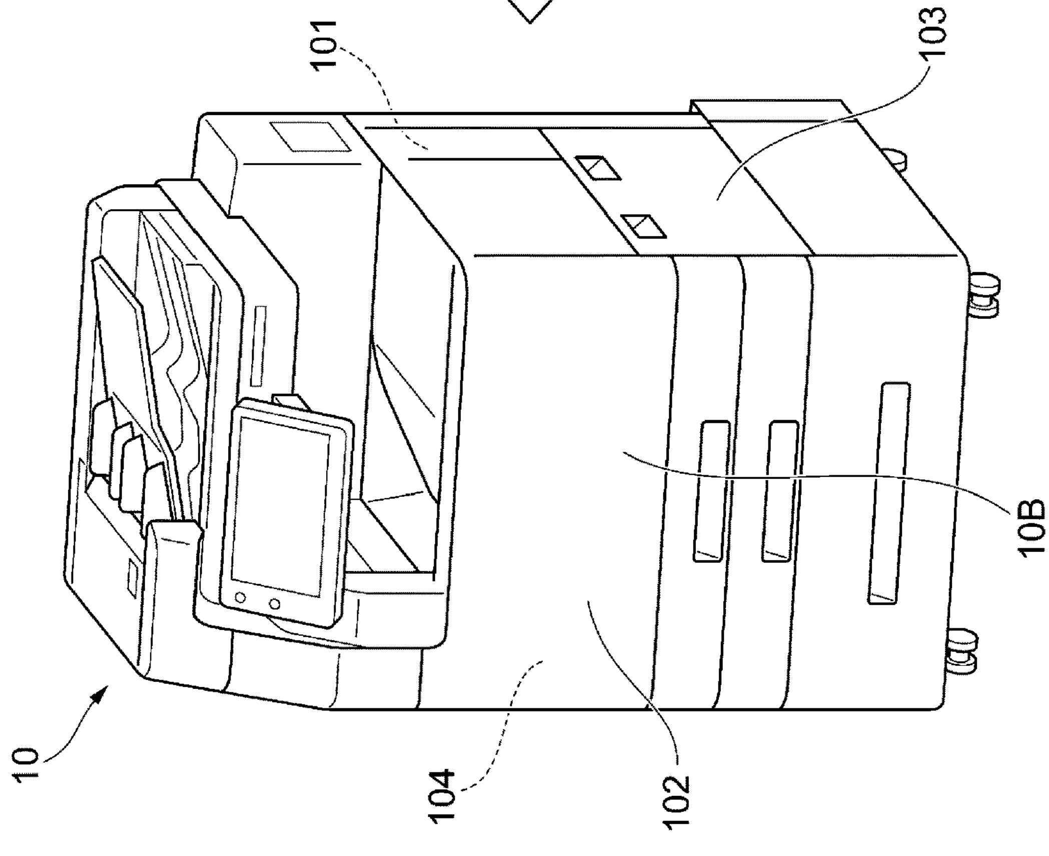

FIGS. 8A and 8B are perspective views of the image forming apparatus 10.

FIG. 8A illustrates a state in which an outer covering 10B provided on the image forming apparatus 10 is closed, and FIG. 8B illustrates a state in which the outer covering 10B provided on the image forming apparatus 10 is opened.

In the present exemplary embodiment, as illustrated in FIG. 8A, the image forming apparatus 10 has a back surface 101, a front surface 102, a right side surface 103, and a left side surface 104.

In the present exemplary embodiment, as illustrated in FIG. 8B, an installation body 700 is installed in the apparatus body 10A of the image forming apparatus 10. The installation body 700 is installed adjacent to the front surface 102 of the image forming apparatus 10. The installation body 700 has a function of receiving the above-described substances discharged from each drum unit 400.

In the present exemplary embodiment, as described above, the substances are discharged through the opening 402A (see FIG. 5) in the drum unit 400. In the present exemplary embodiment, the substances discharged from the drum unit 400 through the opening 402A in the drum unit 400 are received by the installation body 700.

In the present exemplary embodiment, substances are also discharged from each developing unit 500 (see FIG. 2) and the belt cleaning device 52 (see FIG. 1) of the transfer unit 100 and received by the installation body 700.

The installation body 700 has a function of transporting the discharged substances, and transports the discharged substances received from the drum units 400, the developing units 500, and the belt cleaning device 52 to a receiving container (not illustrated).

Figure 9:
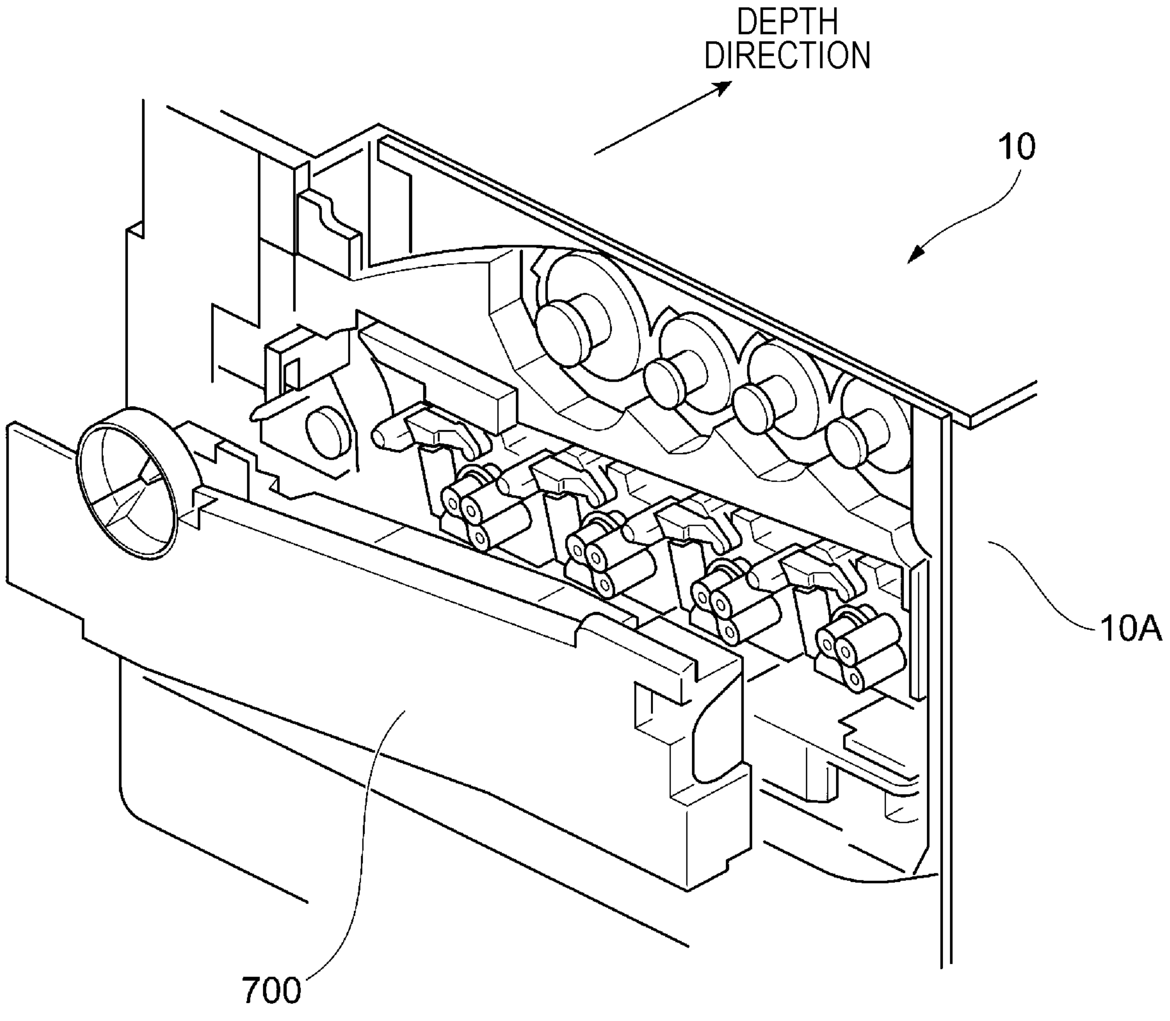
FIG. 9 illustrates a state in which an installation body is removed.

The installation body 700 illustrated in FIG. 8 is removably attachable to the apparatus body 10A, and is removed from the apparatus body 10A by being pulled toward the front of the image forming apparatus 10, as illustrated in FIG. 9 (diagram illustrating a state in which the installation body 700 is removed) when, for example, the drum units 400 are replaced.

The manner in which the installation body 700 is installed is not limited to this, and the installation body 700 may, for example, be configured to rotate about a hinge. Alternatively, the installation body 700 may, for example, be configured to slide in an up-down direction or a left-right direction.

The installation body 700 is installed in the apparatus body 10A so as to cover the transfer unit 100 (see FIG. 2), the drum units 400, the developing units 500, and the exposure units 600.

In the present exemplary embodiment, the transfer unit 100 (see FIG. 2), the drum units 400, the developing units 500, and the exposure units 600 are positioned further in the depth direction (see FIG. 9) of the image forming apparatus 10 than the installation body 700.

In the present exemplary embodiment, since the transfer unit 100, the drum units 400, the developing units 500, and the exposure units 600 are positioned further in the depth direction than the installation body 700, the transfer unit 100, the drum units 400, the developing units 500, and the exposure units 600 are covered by the installation body 700.

Here, the expression "the transfer unit 100, the drum units 400, the developing units 500, and the exposure units 600 are covered by the installation body 700" means that these units and the installation body 700 overlap when projected in the depth direction of the image forming apparatus 10 onto an imaginary plane (not illustrated) orthogonal to the depth direction.

Although the entirety of each of the above-described units is covered by the installation body 700 in the present exemplary embodiment, the installation body 700 is not limited to this, and the units may be partially covered by the installation body 700.

As illustrated in FIG. 8B, the installation body 700 includes an operating part 710 that is rotatable and operates when manipulated by the user.

In the present exemplary embodiment, the operating part 710 operates when manipulated by the user while the installation body 700 is installed in the apparatus body 10A and while the drum units 400 and other units are covered by the installation body 700.

In this case, in the present exemplary embodiment, an urging mechanism (described below), which is an example of an urging unit and provided on the installation body 700, operates in association with the operation of the operating part 710.

Accordingly, in the present exemplary embodiment, each drum unit 400 is urged in the attachment direction of the drum unit 400. More specifically, each drum unit 400 is urged in the depth direction of the image forming apparatus 10. In other words, each drum unit 400 is urged toward the back surface 101 (see FIG. 8A) of the image forming apparatus 10.

In addition, in the present exemplary embodiment, an actuation mechanism (described below) included in the installation body 700 is actuated in association with the operation of the operating part 710. Accordingly, the cover member 404 (see FIG. 5), which is an example of an actuating part, is actuated to uncover the opening 402A in each drum unit 400.

Figure 10:
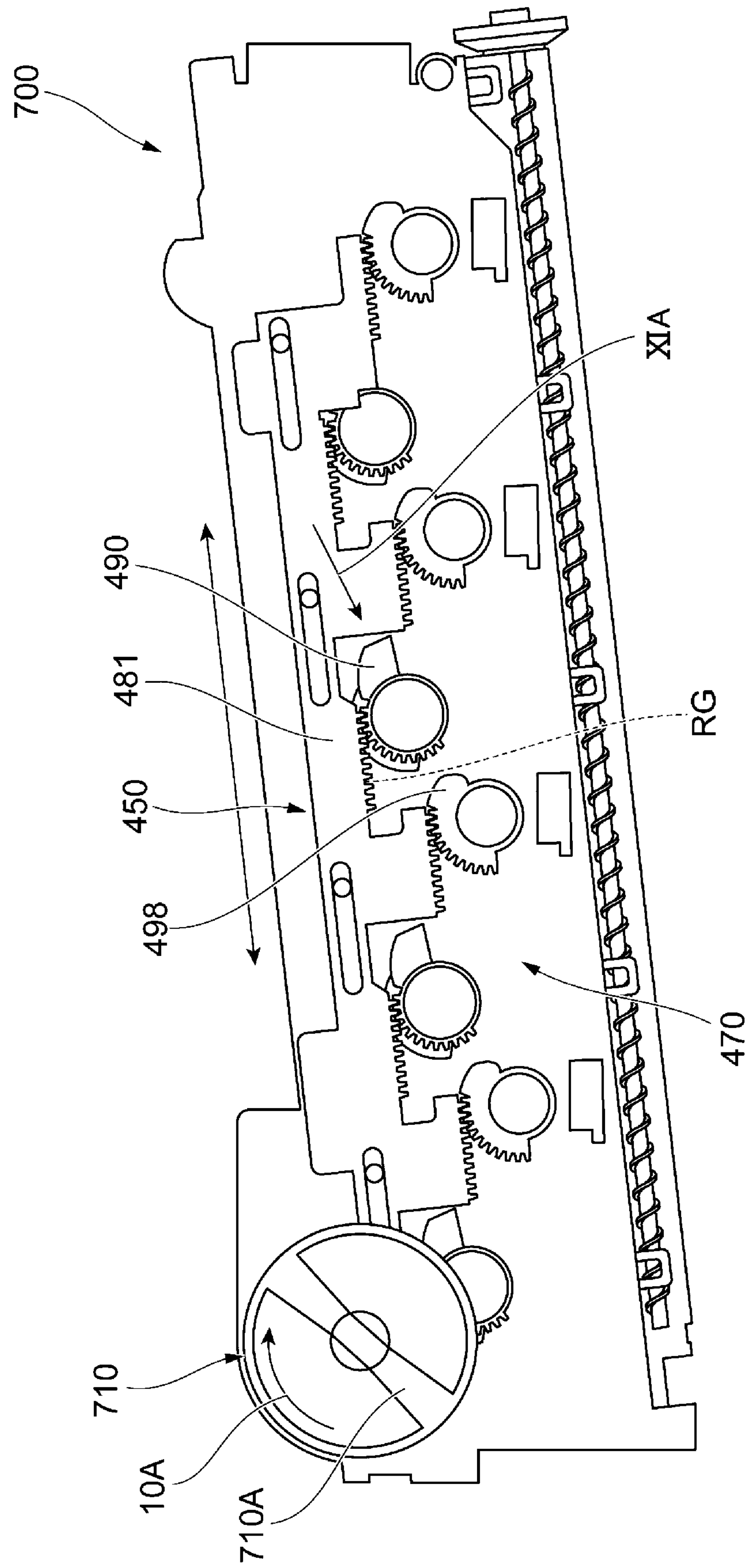
FIG. 10 illustrates the internal structure of the installation body.

FIG. 10 illustrates the internal structure of the installation body 700.

Referring to FIG. 10, as described above, the installation body 700 includes the operating part 710 that is rotatable.

The operating part 710 includes a finger knob 710A that extends in a radial direction of the operating part 710 and that is capable of being held with the user's fingers.

The installation body 700 also includes an actuation mechanism 450 that actuates an actuating part provided on each drum unit 400.

The actuation mechanism 450, which is an example of an actuation unit, actuates the actuating part in association with the operation of the operating part 710 by receiving force from the operating part 710.

In the present exemplary embodiment, the cover member 404 (see FIG. 5) that covers the opening 402A in each drum unit 400 serves as the actuating part, and the actuation mechanism 450 actuates the cover member 404 to cover and uncover the opening 402A in the drum unit 400.

More specifically, the actuation mechanism 450 rotates the cover member 404 to cover and uncover the opening 402A in the drum unit 400.

In addition, in the present exemplary embodiment, the installation body 700 includes an urging mechanism 470 that urges each drum unit 400 in the attachment direction of the drum unit 400.

The urging mechanism 470, which is an example of an urging unit, operates in association with the operating part 710 while the drum units 400 are covered by the installation body 700, and urges each drum unit 400 in the attachment direction in which the drum unit 400 is attached to the apparatus body 10A.

In the present exemplary embodiment, the installation body 700 includes both the actuation mechanism 450 and the urging mechanism 470. More specifically, in the present exemplary embodiment, the installation body 700 includes both the actuation mechanism 450 that actuates the cover member 404 to cover and uncover the opening 402A and the urging mechanism 470 that urges each drum unit 400.

In the present exemplary embodiment, the user rotates the operating part 710 in the direction shown by arrow 10A, which is an example of one direction, so that the cover member 404, which is an example of an actuating part, is actuated to uncover the opening 402A and that each drum unit 400 is urged in the attachment direction in which the drum unit 400 is attached.

More specifically, in the present exemplary embodiment, when the user rotates the operating part 710 in the one direction, the cover member 404 rotates to uncover the opening 402A, and each drum unit 400 is urged in the depth direction of the image forming apparatus 10.

In the present exemplary embodiment, when the user rotates the operating part 710 in a direction opposite to the direction shown by arrow 10A, the cover member 404 is actuated to cover the opening 402A.

In the present exemplary embodiment, referring to FIG. 10, a sliding member 481 constitutes a portion of the actuation mechanism 450 and a portion of the urging mechanism 470, and first rotating bodies 490 are rotated by force applied by the sliding member 481.

In the present exemplary embodiment, the first rotating bodies 490, which are examples of a rotating body, correspond to respective ones of the drum units 400 included in the image forming units 30Y, 30M, 30C, and 30K (see FIG. 1).

In the present exemplary embodiment, the sliding member 481 slides when the operating part 710 rotates, and each of the first rotating bodies 490 rotates when the sliding member 481 slides.

In the present exemplary embodiment, a rack gear (not illustrated) provided on the sliding member 481 meshes with a gear provided on the operating part 710, so that the sliding member 481 slides when the operating part 710 rotates.

When the sliding member 481 slides, the sliding member 481 applies force to the first rotating bodies 490, and the first rotating bodies 490 rotate accordingly.

More specifically, in the present exemplary embodiment, rack gears RG provided on the sliding member 481 mesh with gears provided on outer peripheral surfaces of the first rotating bodies 490, so that the first rotating bodies 490 rotate when the sliding member 481 slides.

When each first rotating body 490 rotates, the cover member 404 (see FIG. 5) rotates together with the first rotating body 490 to cover the opening 402A in the corresponding drum unit 400.

In addition, in the present exemplary embodiment, when each first rotating body 490 rotates, a pressing member, which will be described below, moves toward the corresponding drum unit 400 and urges the drum unit 400 in the depth direction of the image forming apparatus 10.

In the present exemplary embodiment, second rotating bodies 498 are also provided. The second rotating bodies 498 correspond to respective ones of the developing units 500 (see FIG. 2) included in the image forming units 30Y, 30M, 30C, and 30K (see FIG. 1).

In the present exemplary embodiment, when the sliding member 481 slides, the sliding member 481 also applies force to the second rotating bodies 498, so that the second rotating bodies 498 also rotate.

When each second rotating body 498 rotates, a cover member (not illustrated) provided on the corresponding developing unit 500 is actuated to cover or uncover an opening in the developing unit 500.

Figure 11A:
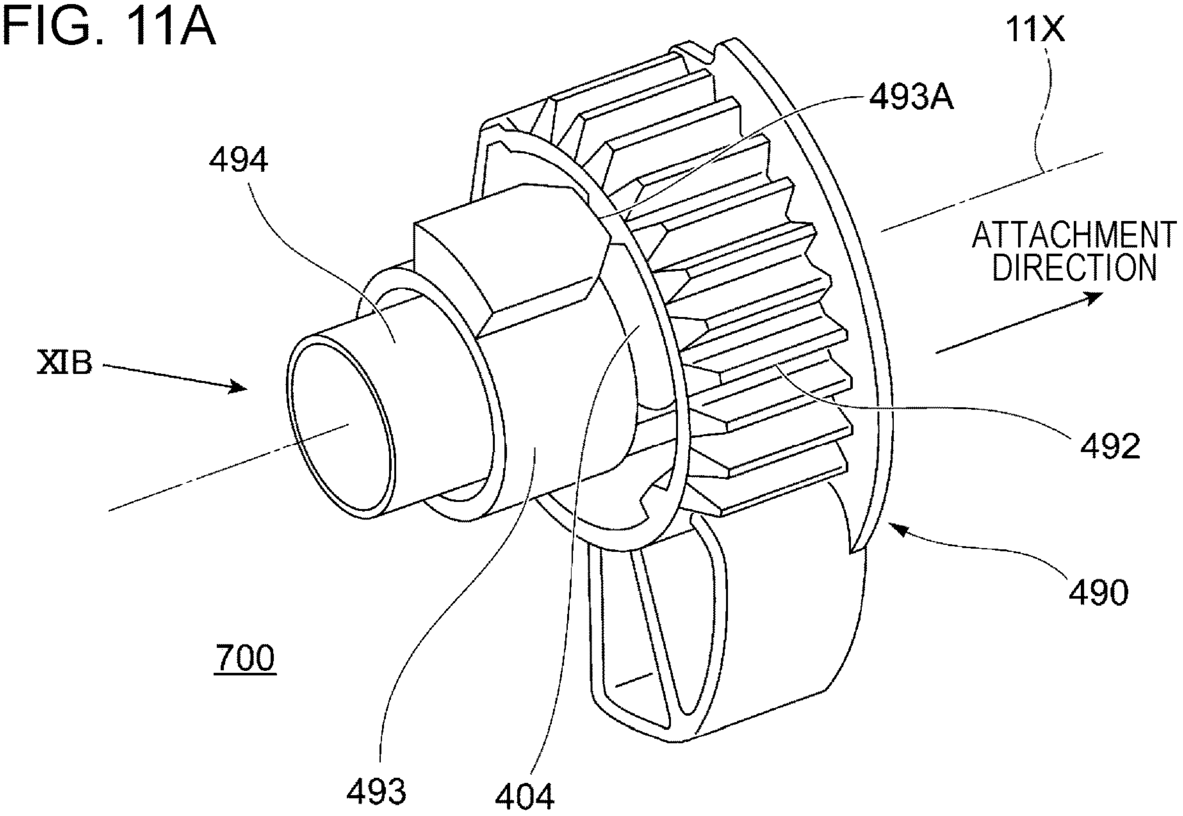
FIGS. 11A and 11B illustrate a first rotating body.
Figure 11B:
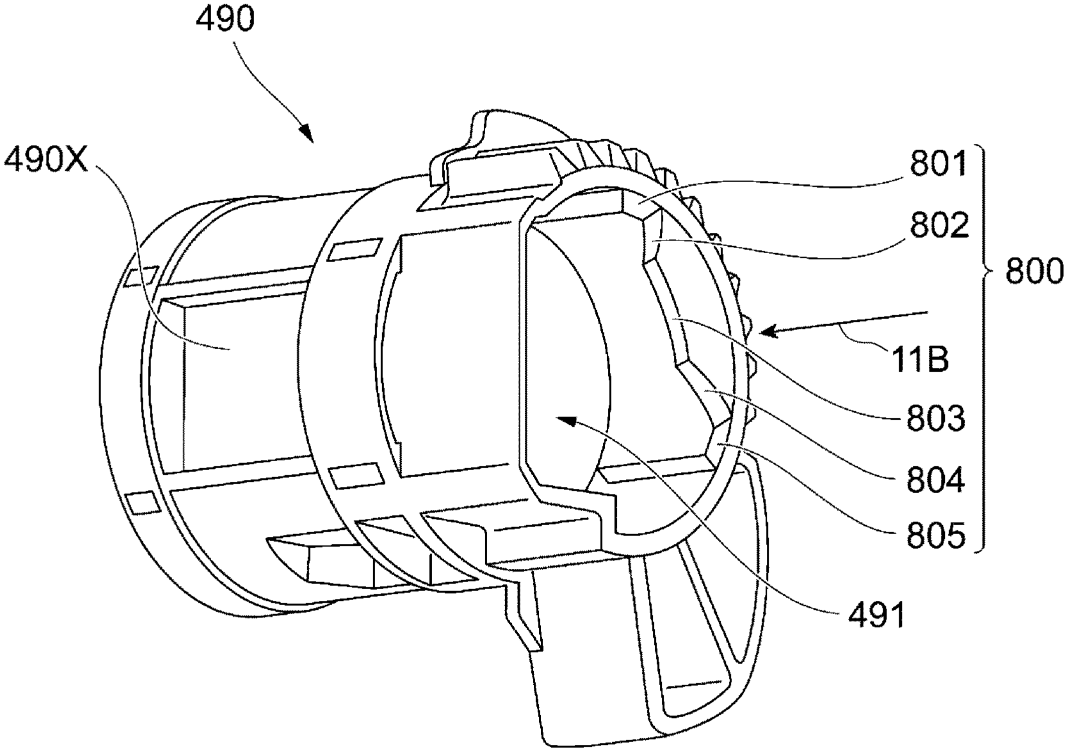

FIGS. 11A and 11B illustrate the first rotating body 490. FIG. 11A is a perspective view of the first rotating body 490 viewed in the direction shown by arrow XIA in FIG. 10. FIG. 11B is a perspective view of the first rotating body 490 viewed in the direction shown by arrow XIB in FIG. 11A.

In the present exemplary embodiment, as illustrated in FIG. 11B, the first rotating body 490 has a through hole 491 that receives the cover member 404 (see FIG. 11A) included in the corresponding drum unit 400.

In the present exemplary embodiment, when the installation body 700 is installed in the apparatus body 10A (see FIG. 9), the cylindrical portion 402 (see FIG. 3) and the cover member 404 are inserted in the through hole 491.

In addition, in the present exemplary embodiment, as illustrated in FIG. 11B, the first rotating body 490 has an opening 490X for allowing the substances discharged from the opening 402A in the cylindrical portion 402 (see FIG. 5) to pass therethrough.

In addition, in the present exemplary embodiment, as illustrated in FIG. 11A, a gear 492 that meshes with the corresponding rack gear RG on the sliding member 481 (see FIG. 10) is provided on the outer peripheral surface of the first rotating body 490.

In the present exemplary embodiment, the through hole 491 is substantially D-shaped when the first rotating body 490 is viewed in the direction shown by arrow 11B in FIG. 11B. In addition, in the present exemplary embodiment, the outer shape of the cover member 404 is also substantially D-shaped, as illustrated in FIG. 3.

In the present exemplary embodiment, the shape of the inner surface of the through hole 491 is similar to the outer shape of the cover member 404, so that when the first rotating body 490 rotates while the cover member 404 is disposed therein, the cover member 404 is rotated by the rotation of the first rotating body 490.

Although the inner surface of the through hole 491 has a shape similar to the outer shape of the cover member 404 so that the cover member 404 is rotated by the rotation of the first rotating body 490 in the present exemplary embodiment, the mode in which the cover member 404 is rotated by the rotation of the first rotating body 490 is not limited to this.

Another mode in which the cover member 404 is rotated by the rotation of the first rotating body 490 may be, for example, such that the inner peripheral surface of the first rotating body 490 has a groove that receives the projecting portion 404A (see FIG. 5) provided on the cover member 404 and that the first rotating body 490 pushes the projecting portion 404A in the circumferential direction of the cover member 404 to rotate the cover member 404.

In addition, in the present exemplary embodiment, as illustrated in FIG. 11A, a pressing member 493 that serves as a portion of the urging mechanism 470 (see FIG. 10) and a coil spring 494 that urges the pressing member 493 toward the cover member 404 are provided on the installation body 700.

In addition, in the present exemplary embodiment, as illustrated in FIG. 11B, the first rotating body 490 has a cam surface 800 that extends in the circumferential direction of the first rotating body 490.

In the present exemplary embodiment, the cam surface 800 of the first rotating body 490 is brought into contact with a pressing portion 493A (see FIG. 11A) of the pressing member 493.

As illustrated in FIG. 11B, the cam surface 800 includes a first flat surface 801, a first inclined surface 802, an intermediate flat surface 803, a second inclined surface 804, and a second flat surface 805.

The first flat surface 801, the intermediate flat surface 803, and the second flat surface 805 are formed to extend along an imaginary plane (not illustrated) orthogonal to the axial direction of the first rotating body 490.

The first inclined surface 802 and the second inclined surface 804 are inclined with respect to the imaginary plane.

In the present exemplary embodiment, the first flat surface 801 and the second flat surface 805 are at the same position in the axial direction of the first rotating body 490.

In the present exemplary embodiment, the intermediate flat surface 803 is positioned closer to the cover member 404 (see FIG. 11A) than the first flat surface 801 and the second flat surface 805 in the axial direction of the first rotating body 490.

In the present exemplary embodiment, the first inclined surface 802 is formed to connect the first flat surface 801 and the intermediate flat surface 803, and the second inclined surface 804 is formed to connect to the second flat surface 805 and the intermediate flat surface 803.

Referring to FIG. 11A, in the present exemplary embodiment, the first rotating body 490 rotates about a rotational axis 11X that extends in the attachment direction of the drum unit 400.

In addition, in the present exemplary embodiment, the pressing member 493 serves as an operatively associated part that operates in association with the drum unit 400. In the present exemplary embodiment, the cam surface 800 (see FIG. 11B) of the first rotating body 490 is brought into contact with the pressing portion 493A of the pressing member 493, which is an example of an operatively associated part that operates in association with the drum unit 400.

The urging mechanism 470 (see FIG. 10) rotates each first rotating body 490 having the cam surface 800 about the rotational axis 11X, and thereby urges the corresponding drum unit 400 in the attachment direction of the drum unit 400.

Figure 12A:
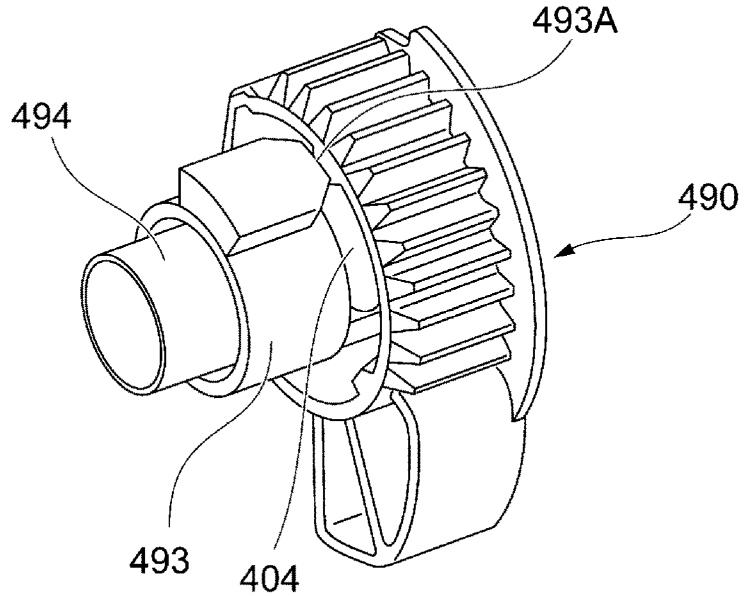
FIGS. 12A to 12C illustrate the first rotating body in different states.
Figure 12B:
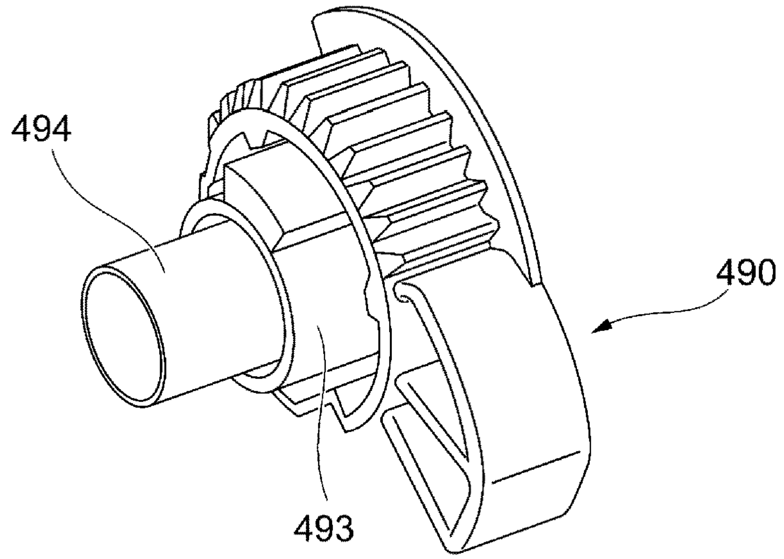
Figure 12C:
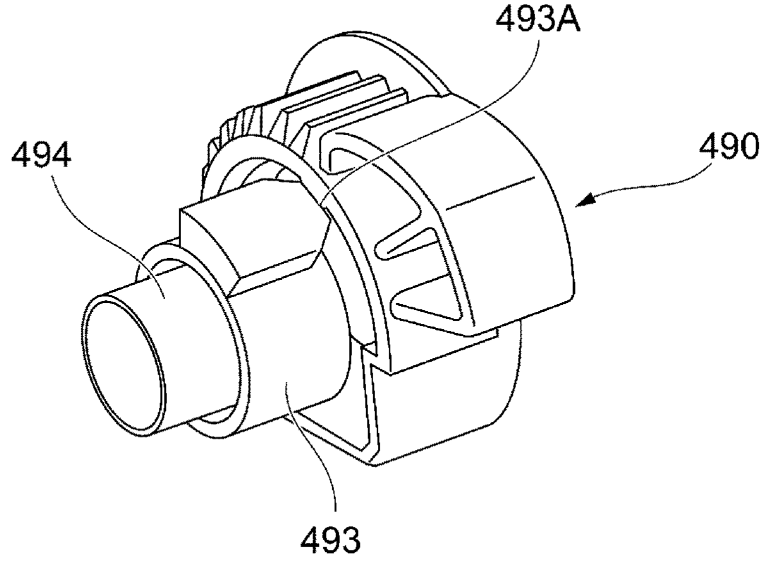

FIGS. 12A to 12C illustrate the first rotating body 490 in different states.

FIG. 12A illustrates the first rotating body 490 before being rotated, FIG. 12B illustrates the first rotating body 490 during rotation thereof, and FIG. 12C illustrates the first rotating body 490 after being rotated.

The state illustrated in FIG. 12A is a state immediately after installation of the installation body 700 in the apparatus body 10A.

Referring to FIG. 12A, in a state before the first rotating body 490 is rotated, the first flat surface 801 (see FIG. 11B) is in contact with the pressing portion 493A of the pressing member 493.

When the first rotating body 490 in the state illustrated in FIG. 12A starts to rotate, the first inclined surface 802 (see FIG. 11B) moves to face the pressing portion 493A.

Accordingly, the pressing member 493 moves toward the cover member 404.

When the first rotating body 490 starts to rotate, the pressing portion 493A moves toward the cover member 404 while being guided by the first inclined surface 802, and accordingly the pressing member 493 moves toward the cover member 404.

When the first rotating body 490 in the state illustrated in FIG. 12A starts to rotate, the cover member 404 also starts to rotate, and starts to uncover the opening 402A (see FIG. 5) in the drum unit 400.

In the present exemplary embodiment, while the pressing portion 493A is being guided by the first inclined surface 802, the pressing member 493 comes into contact with the cover member 404 and starts to press the cover member 404.

At this time, the pressing member 493 presses the cover member 404 in the attachment direction of the drum unit 400. Accordingly, the drum unit 400 is urged in the depth direction of the image forming apparatus 10.

FIG. 12B illustrates the first rotating body 490 in a state in which the operating part 710 (see FIG. 8B) is rotated halfway.

In the present exemplary embodiment, when the operating part 710 is rotated halfway, the intermediate flat surface 803 (see FIG. 11B) is positioned to face the pressing portion 493A.

In this state, the pressing member 493 is moved toward the cover member 404, and the cover member 404 is pressed by the pressing member 493. In other words, the drum unit 400 is pressed by the pressing member 493.

When the operating part 710 is rotated halfway, the cover member 404 is further rotated, so that the opening 402A in the drum unit 400 is further uncovered.

In the present exemplary embodiment, when the user manipulates the operating part 710 to uncover the opening 402A in the drum unit 400, the drum unit 400 is urged in the attachment direction of the drum unit 400.

After that, in the present exemplary embodiment, the user further manipulates the operating part 710 so that the first rotating body 490 further rotates, as illustrated in FIG. 12C.

When the state of the first rotating body 490 is changed from the state illustrated in FIG. 12B to the state illustrated in FIG. 12C, the pressing portion 493A is pressed by the second inclined surface 804 (see FIG. 11B) so that the pressing member 493 moves away from the drum unit 400.

Accordingly, in the present exemplary embodiment, the drum unit 400 is enabled to move in an opposite direction that is opposite to the attachment direction of the drum unit 400.

In the state illustrated in FIG. 12C, the second flat surface 805 (see FIG. 11B) is positioned to face the pressing portion 493A, and the pressing member 493 stops after moving away from the drum unit 400.

In addition, in the state illustrated in FIG. 12C, the cover member 404 is not positioned to face the opening 402A in the drum unit 400, and the opening 402A in the drum unit 400 is completely uncovered.

In the present exemplary embodiment, the urging mechanism 470 (see FIG. 10) urges each drum unit 400 in the attachment direction of the drum unit 400, and then stops urging the drum unit 400 in the attachment direction and enables the drum unit 400 to move in the opposite direction that is opposite to the attachment direction, as described above.

More specifically, the urging mechanism 470 stops urging each drum unit 400 during the manipulation of the operating part 710 in the one direction by the user, and enables the drum unit 400 to move in the opposite direction during the manipulation in the one direction.

In the present exemplary embodiment, as described above, the pressing member 493 (see FIG. 12A) presses the cover member 404 of the drum unit 400.

Accordingly, in the present exemplary embodiment, when the user does not press the drum unit 400 by an amount sufficient to cause the overpassing portion 408 (see FIG. 7A) to pass over the overpassing target portion 510 provided on the apparatus body 10A, the overpassing portion 408 is caused to pass over the overpassing target portion 510.

In the present exemplary embodiment, the overpassing portion 408 provided on the drum unit 400 passes over the overpassing target portion 510 before the drum unit 400 is enabled to move in the opposite direction.

More specifically, in the present exemplary embodiment, the overpassing portion 408 provided on the drum unit 400 passes over the overpassing target portion 510 before the intermediate flat surface 803 is positioned to face the pressing portion 493A.

In other words, in the present exemplary embodiment, the overpassing portion 408 provided on the drum unit 400 passes over the overpassing target portion 510 while the first inclined surface 802 is positioned to face the pressing portion 493A.

Thus, the drum unit 400 may be prevented from being released from the urged state before the overpassing portion 408 passes over the overpassing target portion 510.

In the present exemplary embodiment, when the drum unit 400 is enabled to move in the opposite direction, as illustrated in FIG. 7B, the overpassing portion 408 of the drum unit 400 comes into contact with the overpassing target portion 510 provided on the apparatus body 10A.

More specifically, in the present exemplary embodiment, the drum unit 400 starts to move in the opposite direction when the second inclined surface 804 is positioned to face the pressing portion 493A.

Accordingly, the overpassing portion 408 moves toward the overpassing target portion 510 and comes into contact with the overpassing target portion 510.

In the present exemplary embodiment, the spring member 406 (see FIG. 6) is provided to urge the drum unit 400 in the opposite direction, so that the overpassing portion 408 is urged by the spring member 406 and brought into contact with the overpassing target portion 510 provided on the apparatus body 10A.

Thus, the drum unit 400 is positioned with respect to the apparatus body 10A.

The first rotating body 490 may be structured such that no second inclined surface 804 (see FIG. 11B) is provided and that the pressing member 493 continuously presses the drum unit 400. In such a case, the positioning accuracy of the drum unit 400 in the longitudinal direction of the drum unit 400 is easily reduced.

In contrast, in the present exemplary embodiment, the overpassing portion 408 comes into contact with the overpassing target portion 510 after passing over the overpassing target portion 510.

In the present exemplary embodiment, as described above, plural first rotating bodies 490 are provided to correspond to respective ones of the image forming units 30Y, 30M, 30C, and 30K. Similarly, plural pressing members 493, plural spring members 406, and plural coil springs 494 are provided to correspond to respective ones of the image forming units 30Y, 30M, and 30K.

Thus, in the present exemplary embodiment, the urging mechanism 470 urges plural drum units 400 in the attachment direction. In addition, the actuation mechanism 450 actuates cover members 404 that are provided on respective ones of the plural drum units 400 and that serve as actuating parts.

Others

In the above-described example, each drum unit 400 is moved in the depth direction of the image forming apparatus 10 and a direction opposite to the depth direction by bringing the cam surface 800 into contact with the pressing member 493 that operates in association with the drum unit 400.

In other words, in the above-described example, the drum unit 400 is moved back and forth in the attachment direction of the drum unit 400 by bringing the cam surface 800 into contact with the pressing member 493.

The structure for moving the drum unit 400 back and forth is not limited to this, and the drum unit 400 may be moved back and forth by brining the cam surface 800 provided on the first rotating body 490 into direct contact with the drum unit 400.

In this case, among the above-described inclined and flat surfaces of the cam surface 800, the intermediate flat surface 803 is disposed closer to the drum unit 400 than the first flat surface 801 and the second flat surface 805.

In addition, in this case, for example, one of the first flat surface 801 and the second flat surface 805 is placed in contact with the drum unit 400 before the operating part 710 starts to rotate.

When the operating part 710 operates to rotate, one of the first inclined surface 802 and the second inclined surface 804 gradually presses the drum unit 400 so that the drum unit 400 moves in the depth direction of the apparatus body 10A.

Then, when the operating part 710 further rotates, the intermediate flat surface 803 comes into contact with the drum unit 400, and the drum unit 400 is released from the urged state.

Then, when the operating part 710 further rotates, the other one of the first inclined surface 802 and the second inclined surface 804 comes into contact with the drum unit 400, and the drum unit 400 starts to move in the opposite direction.

Also when the cam surface 800 is brought into direct contact with the drum unit 400, similarly to the above-described example, the overpassing portion 408 passes over the overpassing target portion 510, and comes into contact with the overpassing target portion 510 after passing over the overpassing target portion 510.

In addition, although the cover member 404 is described above as an example of an actuating part, the actuating part is not limited to the cover member 404. The actuation mechanism 450 may actuate an object other than the cover member 404.

In such a case, when the operating part 710 is manipulated by the user and the actuating part other than the cover member 404 is actuated, the removable body is urged in the attachment direction of the removable body and then urged in the opposite direction, similarly to the above-described example.

In addition, the removable body is not limited to the drum unit 400, and another removable body, such as the developing unit 500 or the exposure unit 600, may be configured such that the removable body is urged in the attachment direction and the opposite direction when an actuating part of the removable body is actuated.

The removable body may also be, for example, a toner cartridge, and the toner cartridge may be urged in the attachment direction and the opposite direction when an actuating part of the toner cartridge is actuated.

In addition, although the operating part 710 has a disc shape in the above-described example, the shape of the operating part 710 is not limited to a disc shape, and may be other shapes, such as a lever shape.

In addition, although the operating part 710 rotates in the above-described example, the mode of operation of the operating part 710 is not limited to this.

The operating part 710 may, for example, slide in response to manipulation by the user. Also when the operating part 710 is configured to slide, similarly to the above-described example, an actuating part provided on the removable body may be actuated and the removable body may be urged.

Although the cover member 404, which is an example of an actuating part, rotates when the user causes the operating part 710 to operate in the above-described example, the mode of actuation of the actuating part in response to the operation of the operating part 710 is not limited to rotation, and may instead be other movements.

More specifically, although the cover member 404, which is an actuating part and serves as a shutter, is configured to rotate in the above-described example, the cover member 404 may slide to cover or uncover the opening 402A in the drum unit 400 when the user causes the operating part 710 to operate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
- an apparatus body;
- a removable body that includes an actuating part and is removably attachable to the apparatus body;
- an installation body including a rotatable operating part that operates when manipulated by a user, the installation body being installed in the apparatus body such that the installation body covers at least a portion of the removable body; and
- an urging unit that operates in association with the operating part and urges the removable body in an attachment direction, in which the removable body is attached to the apparatus body, while at least the portion of the removable body is covered by the installation body,
- wherein the actuating part is actuated and the removable body is urged in the attachment direction when the user rotates the operating part in one direction.

2. The image forming apparatus according to claim 1, wherein the removable body has an opening and includes a cover member that covers the opening, and
- wherein, when the user rotates the operating part in the one direction, the cover member, which serves as the actuating part, moves or rotates to uncover the opening, and the removable body is urged in the attachment direction.

3. The image forming apparatus according to claim 1, wherein the removable body is one of a plurality of removable bodies, and the urging unit urges the plurality of removable bodies in the attachment direction.

4. The image forming apparatus according to claim 1, wherein after urging the removable body in the attachment direction, the urging unit stops urging the removable body in the attachment direction and enables the removable body to move in an opposite direction that is opposite to the attachment direction.

5. The image forming apparatus according to claim 4, wherein the urging unit stops urging the removable body during the rotation of the operating part in the one direction by the user, and enables the removable body to move in the opposite direction during the rotation in the one direction.

6. The image forming apparatus according to claim 5, further comprising:
- an urging member that urges the removable body in the opposite direction,
- wherein an overpassing portion provided on the removable body that moves in the attachment direction passes over an overpassing target portion provided on the apparatus body before the removable body is enabled to move in the opposite direction, and wherein, when the removable body is enabled to move in the opposite direction, the overpassing portion provided on the removable body that is urged by the urging member in the opposite direction comes into contact with the overpassing target portion provided on the apparatus body.

7. The image forming apparatus according to claim 1, wherein the urging unit urges the removable body in the attachment direction by rotating a rotating body that rotates about a rotational axis extending in the attachment direction, the rotating body having an inclined surface that comes into contact with the removable body or with an operatively associated part that operates in association with the removable body.

8. The image forming apparatus according to claim 1, wherein the installation body has a function of receiving a substance discharged from the removable body through an opening provided in the removable body.

9. The image forming apparatus according to claim 1, wherein the image forming apparatus further comprises an actuation unit that operates in association with the operating part and actuates the actuating part, and wherein the urging unit and the actuation unit are both provided on the installation body.

10. The image forming apparatus according to claim 9, wherein the actuating part is a cover member that covers an opening provided in the removable body, wherein the actuation unit covers and uncovers the opening by moving or rotating the cover member, and wherein the urging unit and the actuation unit that covers and uncovers the opening are both provided on the installation body.

11. An image forming apparatus comprising:

an apparatus body;

a removable body that is removably attachable to the apparatus body;

an installation body including an operating part that operates when manipulated by a user, the installation body being installed in the apparatus body such that the installation body covers at least a portion of the removable body; and an urging unit that operates in association with the operating part and urges the removable body in an attachment direction, in which the removable body is attached to the apparatus body, while at least the portion of the removable body is covered by the installation body, wherein after urging the removable body in the attachment direction, the urging unit stops urging the removable body in the attachment direction and enables the removable body to move in an opposite direction that is opposite to the attachment direction.

12. The image forming apparatus according to claim 11, wherein the urging unit stops urging the removable body during manipulation of the operating part in one direction by the user, and enables the removable body to move in the opposite direction during the manipulation in the one direction.

13. The image forming apparatus according to claim 12, further comprising:

an urging member that urges the removable body in the opposite direction, wherein an overpassing portion provided on the removable body that moves in the attachment direction passes over an overpassing target portion provided on the apparatus body before the removable body is enabled to move in the opposite direction, and wherein, when the removable body is enabled to move in the opposite direction, the overpassing portion provided on the removable body that is urged by the urging member in the opposite direction comes into contact with the overpassing target portion provided on the apparatus body.

14. An image forming apparatus comprising:

an apparatus body;

a removable body that includes an actuating part and is removably attachable to the apparatus body;

an installation body including an operating part that operates when manipulated by a user, the installation body being installed in the apparatus body such that the installation body covers at least a portion of the removable body;

an urging unit that operates in association with the operating part and urges the removable body in an attachment direction, in which the removable body is attached to the apparatus body, while at least the portion of the removable body is covered by the installation body; and an actuation unit that operates in association with the operating part and actuates the actuating part, wherein the urging unit and the actuation unit are both provided on the installation body.

15. The image forming apparatus according to claim 14, wherein the actuating part is a cover member that covers an opening provided in the removable body, wherein the actuation unit covers and uncovers the opening by moving or rotating the cover member, and wherein the urging unit and the actuation unit that covers and uncovers the opening are both provided on the installation body.

* * * * *